(12) United States Patent
Kane et al.

(10) Patent No.: US 8,993,101 B2
(45) Date of Patent: *Mar. 31, 2015

(54) LUMINESCENT BORATES, MATERIALS AND ARTICLES INCORPORATING SUCH BORATES, AND METHODS AND APPARATUS FOR THEIR PRODUCTION AND USE IN ARTICLE AUTHENTICATION

(71) Applicant: Honeywell International Inc., Morristown, NJ (US)

(72) Inventors: James Kane, Lawrenceville, NJ (US); William Ross Rapoport, Bridgeport, NJ (US); Carsten Lau, Garbsen (DE)

(*) Notice: Subject to any disclaimer, the term of this patent is extended or adjusted under 35 U.S.C. 154(b) by 232 days.

This patent is subject to a terminal disclaimer.

(21) Appl. No.: 13/672,136

(22) Filed: Nov. 8, 2012

(65) Prior Publication Data

US 2013/0122266 A1    May 16, 2013

Related U.S. Application Data

(60) Provisional application No. 61/560,102, filed on Nov. 15, 2011.

(51) Int. Cl.
*B42D 15/00* (2006.01)
*C09K 11/77* (2006.01)
(Continued)

(52) U.S. Cl.
CPC ......... *C09K 11/7712* (2013.01); *C09K 11/7756* (2013.01); *B42D 15/00* (2013.01);
(Continued)

(58) Field of Classification Search
CPC ............. C09K 11/778; C09K 11/7712; C09K 11/7756

USPC ............ 428/195.1, 206; 252/301.4 R; 283/92
See application file for complete search history.

(56) References Cited

U.S. PATENT DOCUMENTS

| 4,202,491 A | 5/1980 | Suzuki |
| 4,990,480 A * | 2/1991 | Luetkens et al. ............... 502/204 |

(Continued)

FOREIGN PATENT DOCUMENTS

EP    2354208 A1    8/2011

OTHER PUBLICATIONS

The International Search Report mailed Apr. 1, 2013 in International Application No. PCT/US2012/064912.

(Continued)

*Primary Examiner* — Gerard Higgins
(74) *Attorney, Agent, or Firm* — Ingrassia Fisher & Lorenz, PC

(57) ABSTRACT

Embodiments include luminescent materials and associated production methods. The material includes a crystal borate having a first substitutable element and a second substitutable element, one or more rare earth ions substituted for the first substitutable element, and chromium substituted for the second substitutable element. The one or more rare earth ions are selected from a group consisting of neodymium and ytterbium. The material also may include a medium within which particles of the borate are incorporated. The medium, with the luminescent material particles, may form a security feature of an article. Embodiments of methods for identifying whether such a luminescent material is incorporated with an article include exposing a portion of the article to excitation in a chromium absorption band, and determining whether a detected emission produced by the article as a result of the excitation indicates an ytterbium emission after termination of the exposing step.

20 Claims, 6 Drawing Sheets

(51) Int. Cl.
  *C09D 11/50* (2014.01)
  *G07D 7/12* (2006.01)
  *B42D 25/29* (2014.01)
  *B42D 25/00* (2014.01)

(52) U.S. Cl.
  CPC ............ *C09K 11/778* (2013.01); *C09D 11/50* (2013.01); *G07D 7/122* (2013.01); *B42D 25/29* (2014.01); *B42D 25/00* (2014.01); *B42D 2033/20* (2013.01)
  USPC ................. 428/195.1; 428/206; 252/301.4 R; 283/92

(56) References Cited

U.S. PATENT DOCUMENTS

| | | | |
|---|---|---|---|
| 5,043,308 A | * | 8/1991 | Luetkens et al. ............ 502/204 |
| 8,399,900 B2 | * | 3/2013 | Hartmann ...................... 257/98 |
| 2007/0096057 A1 | | 5/2007 | Hampden-Smith et al. |
| 2010/0065780 A1 | | 3/2010 | Buissette et al. |
| 2011/0089458 A1 | * | 4/2011 | Hartmann ...................... 257/98 |
| 2011/0140042 A1 | | 6/2011 | Xu et al. |
| 2013/0119274 A1 | * | 5/2013 | Kane et al. ................. 250/459.1 |

OTHER PUBLICATIONS

The International Search Report mailed Apr. 1, 2013 in International Application No. PCT/US2012/064927.

* cited by examiner

LUMINESCENT BORATES, MATERIALS AND ARTICLES INCORPORATING SUCH BORATES, AND METHODS AND APPARATUS FOR THEIR PRODUCTION AND USE IN ARTICLE AUTHENTICATION

PRIORITY CLAIMS

This application claims the benefit of U.S. Provisional Application No. 61/560,102, filed Nov. 15, 2011.

TECHNICAL FIELD

The present invention generally relates to radiation emitting compounds and methods and apparatus for their use as security materials.

BACKGROUND

A luminescent phosphor compound is a compound that is capable of emitting detectable quantities of radiation in the infrared, visible, and/or ultraviolet spectrums upon excitation of the compound by an external energy source. A typical luminescent phosphor compound includes at least a host material (e.g., a crystal lattice), an emitting ion (e.g., of a rare earth metal), and in some cases, a "sensitizing" ion (e.g., of a transition metal or of a different rare earth metal that can absorb and transfer the energy to the emitting rare earth metal ion). The production of radiation by a phosphor compound is accomplished by absorption of incident radiation by the emitting ion(s) or by either or both the host material and the sensitizing ion(s), followed by energy transfer from the host material/sensitizing ion(s) to the emitting ion(s), and radiation of the transferred energy by the emitting ion(s).

The selected components of a phosphor compound may cause the compound to have particular emission properties, including specific wavelengths for its excitation energy, and specific spectral position(s) for higher spectral energy output emitted by the emitting ions of the phosphor compound ("emissions"). Not every ion will produce emissions in all host materials, however. There are many examples in which radiation that has the potential for emission is quenched, or the energy transfer from the absorbing ions or the host material to the emitting ions is so poor that the radiation effects are barely observable. In other host materials, the radiation effects can be very large and with quantum efficiency near unity.

For a specific phosphor compound that does produce observable emissions, the spectral position(s) of the higher spectral energy content (or luminescent output) in its emissions (i.e., its "spectral signature") may be used to uniquely identify the phosphor compound from other compounds. Primarily, the spectral signature is due to the rare earth ion(s). However, spectral perturbations may be present due to the influence of the host material on the various emitting ions, typically through crystal field strength and splitting. This holds true for the temporal behavior of the emissions, as well.

The unique spectral properties of some phosphor compounds make them well suited for use in authenticating or identifying articles of particular value or importance (e.g., banknotes, passports, biological samples, and so on). Accordingly, luminescent phosphor compounds with known spectral signatures have been incorporated into various types of articles to enhance the ability to detect forgeries or counterfeit copies of such articles, or to identify and track the articles. For example, luminescent phosphor compounds have been incorporated into various types of articles in the form of additives, coatings, and printed or otherwise applied features that may be analyzed in the process of authenticating or tracking an article.

An article that includes a luminescent phosphor compound may be authenticated using specially designed authentication equipment. More particularly, a manufacturer may incorporate a known phosphor compound (e.g., an "authenticating" phosphor compound) into its "authentic" articles. Authentication equipment configured to detect the authenticity of such articles would have knowledge (e.g., stored information and/or a variety of spectral filters) of the wavelengths of absorbable excitation energy and the spectral properties of emissions associated with the authenticating phosphor compound. When provided with a sample article for authentication, the authentication equipment exposes the article to excitation energy having wavelengths that correspond with the known wavelengths of absorption features of the luminescent phosphor compound that lead directly or indirectly to the desired emissions. The authentication equipment senses and characterizes the spectral parameters for any emissions that may be produced by the article. When the spectral signal of detected emissions is within the authenticating parameter range of the detection apparatus that corresponds with the authenticating phosphor compound (referred to as the "detection parameter space"), the article may be considered authentic. Conversely, when the authentication equipment fails to sense signals expected within the detection parameter space, the article may be considered unauthentic (e.g., a forged or counterfeited article).

The above-described techniques are highly effective at detecting and thwarting relatively unsophisticated forgery and counterfeiting activities. However, individuals with the appropriate resources and equipment may be able to employ spectrometry techniques in order to determine the components of some phosphor compounds. The phosphor compounds may then be reproduced and used with unauthentic articles, thus compromising the authentication benefits that may otherwise be provided by a particular phosphor compound. Accordingly, although a number of phosphor compounds have been developed to facilitate article authentication in the above-described manner, it is desirable to develop additional compounds, unique ways of using such compounds with articles, and techniques for authenticating articles, which may render forgery and counterfeiting activities more difficult, and/or which may prove beneficial for identifying and tracking articles of particular interest. Furthermore, other desirable features and characteristics of the present invention will become apparent from the subsequent detailed description of the invention and the appended claims, taken in conjunction with the accompanying drawings and this background of the invention.

BRIEF SUMMARY

An embodiment of a luminescent material includes a borate, one or more rare earth ions, and chromium. The borate has a crystal structure and includes a first substitutable element and a second substitutable element. The rare earth ions are substituted for the first substitutable element, and are selected from a group consisting of neodymium and ytterbium. The chromium is substituted for the second substitutable element.

An embodiment of a method for producing a luminescent material for use in authentication includes preparing a borate having a crystal structure and including a first substitutable element and a second substitutable element, one or more rare earth ions substituted for the first substitutable element, and chromium substituted for the second substitutable element. The one or more rare earth ions are selected from a group consisting of neodymium and ytterbium. The method also includes dispersing the borate in a medium to produce the luminescent material.

An embodiment of an article includes a security feature that includes a medium, and particles of a luminescent borate dispersed in the medium. The luminescent borate includes a borate having a crystal structure and a first substitutable element and a second substitutable element, one or more rare earth ions substituted for the first substitutable element, and chromium substituted for the second substitutable element. The one or more rare earth ions are selected from a group consisting of neodymium and ytterbium.

An embodiment of a method for identifying a luminescent material incorporated with an article includes exposing a portion of the article to exciting radiation in a chromium absorption band, and determining whether a detected emission produced by the portion as a result of the exciting radiation indicates an ytterbium emission after termination of the exposing step.

BRIEF DESCRIPTION OF THE DRAWINGS

Embodiments of the present invention will hereinafter be described in conjunction with the following figures, wherein like numerals denote like elements, and wherein.

DETAILED DESCRIPTION

The following detailed description of various embodiments of the invention is merely exemplary in nature and is not intended to limit the inventive subject matter or the application and uses of the inventive subject matter. Furthermore, there is no intention to be bound by any theory presented in the preceding background or the following detailed description.

Embodiments discussed in detail below include luminescent borates, methods for producing luminescent borates, articles that include luminescent borates, and methods for identifying luminescent borates in the context of article authentication. The embodiments of luminescent borates and methods and apparatus for their detection described below increase the diversity of available materials that may be used for authentication. The spectral signature and decay time constants characterizing emissions from the luminescent borate embodiments discussed herein may be used as measurable quantities for the purpose of authentication.

Figure 1:
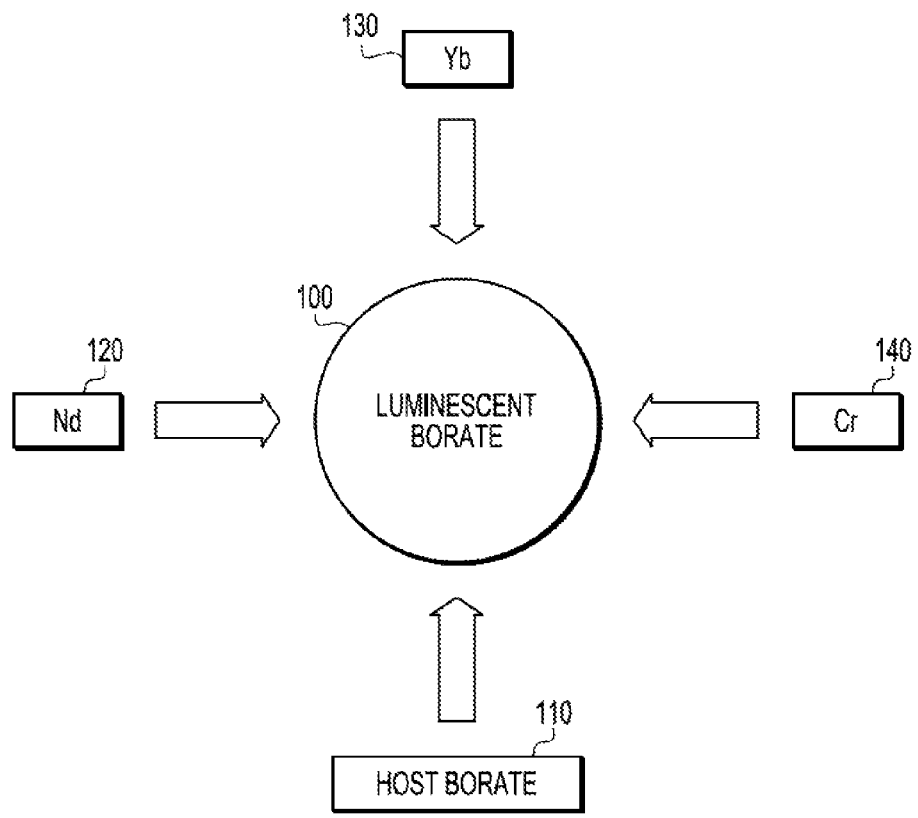
FIG. 1 depicts potential components of a luminescent borate, according to various example embodiments.

FIG. 1 depicts potential components of a luminescent borate 100, according to various example embodiments. Luminescent borate 100 includes a host borate 110, which serves as a host crystal lattice material. Luminescent borate 100 also includes neodymium 120 (Nd), and/or ytterbium 130 (Yb), in an embodiment. In a further embodiment, luminescent borate 100 also includes chromium 140 (Cr).

As will be described in more detail below, the neodymium 120 and ytterbium 130 function in the luminescent borate 100 as emitting ions. As emitting ions, the neodymium 120 and ytterbium 130 produce detectable radiation upon receiving appropriate excitation energy. As will be discussed in more detail below, the neodymium 120 and ytterbium 130 may receive energy for subsequent radiation through multiple mechanisms. For example, neodymium 120 is capable of directly absorbing exciting radiation, and the neodymium 120 may thereafter radiate at least some of the absorbed energy (typically at a different and longer wavelength from the exciting radiation). The ytterbium 130 also may be directly excited, although ytterbium absorption bands are very close to the emission bands (e.g., the absorption bands start at about 910 nm). The host borate 110 also may contain chromium 140 substituted for a lattice ion of the host borate 110, where the chromium 140 functions as a sensitizing ion. As a sensitizing ion, the chromium 140 may absorb exciting radiation within a chromium absorption band, and may transfer at least some of that energy to the neodymium 120 and the ytterbium 130. The neodymium 120 and ytterbium 130, in turn, may produce detectable emissions as a result of having received the energy from the chromium 140. In addition, the neodymium 120 also may function as a sensitizing ion, and may transfer energy (e.g., energy that the neodymium 120 directly absorbed or energy that the neodymium 120 received from the chromium 140) to the ytterbium 130, and the ytterbium 130 may produce detectable emissions as a result of having received the energy from the neodymium 120. The ytterbium 130 also may produce detectable emissions as a result of having received energy from the chromium 140.

The host borate 110 comprises a material into which the neodymium 120, ytterbium 130, and/or chromium 140 are incorporated (i.e., substituted for one or more substitutable elements of the borate 110). More particularly, the host borate 110 is a crystal lattice into which different chemical constituents may substitute at various positions within the lattice. According to an embodiment, the host borate 110 has a crystal structure selected from a group consisting of a monoclinic Huntite-like structure, a rhombohedral Huntite-like structure, and a mixed Huntite-like structure, where "Huntite-like" means that the host borate 110 is isostructural with the mineral Huntite. More particularly, the host borate 110 may have a trigonal crystal structure of R32 space group, in an embodiment. The host borate 110 may be a stoichiometric borate, meaning that one or more emitting ions (e.g., neodymium and/or ytterbium) may be 100 percent substituted into the host lattice for another lattice ion (e.g., yttrium), and the final material still possesses useful luminescent properties. The amount of each ion (or atom) substituted into host borate 110 is described herein in terms of atomic percent.

In an embodiment, host borate 110 is a borate having the formula $MeX_3B_4O_{12}$, where Me is a first substitutable element, X is a second substitutable element, B is boron, and O is oxygen. The term "substitutable element," as used herein, refers to an element of host borate 110 that occupies certain sites within the crystal structure, where another element (e.g., neodymium 120, ytterbium 130, and/or chromium 140) may be substituted into those sites during formation of the luminescent borate 100. For example, when host borate 110 has the formula $MeX_3B_4O_{12}$, Me is a first substitutable element, and various embodiments include either or both neodymium 120 and ytterbium 130 substituted into the Me sites. In addition, X is a second substitutable element, and various embodiments include chromium 140 substituted into the X sites.

In various embodiments, Me is an element selected from a group consisting of yttrium (Y), lanthanum (La), gadolinium (Gd), lutetium (Lu), and a mixture thereof, and X is an element selected from a group consisting of aluminum (Al), scandium (Sc), gallium (Ga), and a mixture thereof. For example, host borate 110 may be an yttrium aluminum borate ($YAl_3B_4O_{12}$, referred to herein as "YAB"), a lanthanum aluminum borate ($LaAl_3B_4O_{12}$), a gadolinium aluminum borate ($GdAl_3B_4O_{12}$), or a lutetium aluminum borate ($LuAl_3B_4O_{12}$), in various embodiments. In other embodiments, host borate 110 may be an yttrium scandium borate ($YSc_3B_4O_{12}$), a lanthanum scandium borate ($LaSc_3B_4O_{12}$), a gadolinium scandium borate ($GdSc_3B_4O_{12}$), or a lutetium scandium borate ($LuSc_3B_4O_{12}$). In still other embodiments, host borate 110 may be an yttrium gallium borate ($YGa_3B_4O_{12}$), a lanthanum gallium borate ($LaGa_3B_4O_{12}$), a gadolinium gallium borate ($GdGa_3B_4O_{12}$), or a lutetium gallium borate ($LuGa_3B_4O_{12}$). The description, below, primarily uses YAB as an example of a host borate 110 that is suitable for use with the various embodiments. It is to be understood that host borates other than YAB also could be used, such as the alternate examples listed above, and such alternate embodiments are considered to be within the scope of the inventive subject matter.

A first embodiment of luminescent borate 100 includes host borate 110 with neodymium 120 substituted for a first substitutable element (e.g., Me when host borate 110 has the formula $MeX_3B_4O_{12}$) at a first substitution percentage of at least 20 percent, and/or ytterbium 130 substituted for the first substitutable element at a second substitution percentage. The second substitution percentage may be equal to or different from the first substitution percentage. For example, in an embodiment, the neodymium 120 is substituted for the first substitutable element at a substitution percentage in a range of about 50 to about 95 percent, and the ytterbium 130 is substituted for the first substitutable element at a substitution percentage in a range of about 5 to about 50 percent. In another example embodiment, the neodymium 120 is substituted for the first substitutable element at a substitution percentage in a range of about 80 to about 90 percent, and the ytterbium 130 is substituted for the first substitutable element at a substitution percentage in a range of about 10 to about 20 percent.

According to an embodiment, the number of Me atoms of the host borate 110 that may be replaced by neodymium 120 and/or ytterbium 130 is equal to 100 percent. In other words, the total, combined substitution percentage of the neodymium 120 and ytterbium 130 for the first substitutable element, Me, may be up to 100 percent, although it can be less than 100 percent, as well. Each Me atom and X atom of host borate 110 that allows for replacement with neodymium 120, ytterbium 130, and chromium 140 atoms has a similar size, similar loading, and similar coordination preference as the ion it will be replaced with. During formation of the luminescent borate 100, the atoms in each position within the host borate 110 will be accounted for 100 atomic percent. Although many emitting ions are concentration quenched well below a 100 percent substitution level, it has been found that, in certain embodiments, neodymium 120 may be substituted into host borate 110 at substitution percentages up to 100 percent without extensive concentration quenching. It is believed that the high neodymium 120 substitution levels are possible in some of the various host borate 110 embodiments, because the physical separation of the emitting ions in the host borate 110 is sufficiently far apart so that the interaction term is significantly reduced.

A second embodiment of luminescent borate 100 includes host borate 110 with either or both of neodymium 120 and ytterbium 130 substituted for a first substitutable element (e.g., Me when host borate 110 has the formula $MeX_3B_4O_{12}$), and chromium 140 substituted for a second substitutable element (e.g., X when host borate 110 has the formula $MeX_3B_4O_{12}$). For example, in an embodiment, the luminescent borate 100 may include neodymium 120 substituted for the first substitutable element and chromium 140 substituted for the second substitutable element. In another embodiment, the luminescent borate 100 may include ytterbium 130 substituted for the first substitutable element and chromium 140 substituted for the second substitutable element. In yet another embodiment, the luminescent borate 100 may include both neodymium 120 and ytterbium 130 substituted for the first substitutable element, and chromium 140 substituted for the second substitutable element.

In any of the above-described embodiments that include chromium 140, the chromium 140 may be substituted at a substitution percentage up to 100 percent. For example, the chromium 140 may be substituted at a substitution percentage in a range of about 10 to about 20 percent. It has been found that the chromium 140 transfers energy to the neodymium 120 very efficiently. Accordingly, the substitution percentage of the neodymium 120 may be significantly lower in embodiments that include chromium 140, when compared with embodiments that do not include chromium 140, while still being capable of efficiently producing detectable emissions. For example, in an embodiment that includes chromium 140, the neodymium 120 may be substituted for the first substitutable element at a substitution percentage as low as about 5 percent (e.g., in a range of about 5 to about 95 percent, about 10 to about 20 percent, and so on). In embodiments that include chromium 140 and ytterbium 130 (with or without the neodymium 120), the ytterbium 130 also may be substituted for the first substitutable element at a substitution percentage of as low as about 5 percent (e.g., in a range of about 5 to about 50 percent, about 10 to about 50 percent, and so on).

Embodiments that include host borate 110, neodymium 120, and ytterbium 130 (but no chromium 140) are referred to herein as "Nd:Yb:Borates." Embodiments that include host borate 110, neodymium 120, and chromium 140 (but no ytterbium 130) are referred to herein as "Cr:Nd:Borates." Embodiments that include host borate 110, ytterbium 130, and chromium 140 (but no neodymium 120) are referred to herein as "Cr:Yb:Borates." Finally, embodiments that include host borate 110, neodymium 120, ytterbium 130, and chromium 140 are referred to herein as "Cr:Nd:Yb:Borates."

As used herein, "appropriate excitation energy" refers to excitation energy having a range of wavelengths that corresponds to an absorption band of an absorbing ion of luminescent borate 100. When appropriate excitation energy is directed toward a luminescent borate 100 of any of the above-listed embodiments, the excitation energy is absorbed by absorbing ions within the luminescent borate 100, and emitting ions (i.e., ions that may be the same or different from the absorbing ions) within the luminescent borate 100 may produce detectable emissions. For example, in embodiments that include neodymium 120 (e.g., Nd:Yb:Borates, Cr:Nd:Borates, and Cr:Nd:Yb:Borates), the neodymium 120 may function as an absorbing ion, which may directly absorb appropriate excitation energy (e.g., excitation energy in a neodymium absorption band). In embodiments that also include ytterbium (e.g., Nd:Yb:Borates and Cr:Nd:Yb:Borates), it has been found that the neodymium 120 efficiently transfers energy to the ytterbium 130, and the ytterbium 130 may produce detectable emissions in one or more ytterbium emission bands. Accordingly, the neodymium 120 functions as an absorbing ion, and the ytterbium 130 functions as an emitting ion. The neodymium 120 also may function as an emitting ion, which produces detectable emissions in one or more neodymium emission bands. As used herein, an "emission band" is defined herein to mean a continuous range of wavelengths of the electromagnetic spectrum within which concentrated, non-negligible (e.g., detectable) emissions occur from one or more emitting ions of the luminescent material. For any particular emitting ion, an "emission band" is bounded by a lower wavelength below which emissions are negligible for that ion, and an upper wavelength above which emissions are negligible for that ion.

In addition, in embodiments that include chromium 140 (e.g., Cr:Nd:Borates, Cr:Yb:Borates, and Cr:Nd:Yb:Borates), the chromium 140 may function as an absorbing ion, which may directly absorb appropriate excitation energy (e.g., excitation energy in a chromium absorption band). In embodiments that include neodymium 120 and chromium 140 (e.g., Cr:Nd:Borates and Cr:Nd:Yb:Borates), it has been found that at least some of the energy directly absorbed by the chromium 140 may be transferred to the neodymium 120, and that energy transfer from chromium 140 to neodymium 120 is highly efficient. Accordingly, in addition to directly absorbing energy in the neodymium absorption band, the neodymium 120 also may indirectly absorb excitation energy corresponding to a chromium absorption band via chromium 140 absorption and transfer to the neodymium 120. In such embodiments, the chromium 140 may function as a primary absorber, and the neodymium 120 may function as a secondary absorber. Again, in embodiments that also include ytterbium (e.g., Cr:Nd:Yb:Borates), the neodymium 120 efficiently transfers energy to the ytterbium 130, and the ytterbium 130 may produce detectable emissions in one or more ytterbium emission bands. Again, the neodymium 120 also may function as an emitting ion, which produces detectable emissions in one or more neodymium emission bands. In embodiments that include only chromium 140 and ytterbium 130 (e.g., Cr:Yb:Borates), as long as a sufficient quantity of chromium 140 is present (e.g., 5 percent substitution or more), at least some of the energy directly absorbed by the chromium 140 may be transferred to the ytterbium 130, and the ytterbium 130 may produce detectable emissions in one or more ytterbium emission bands. Accordingly, in addition to directly absorbing energy in the ytterbium absorption band, the ytterbium 130 also may indirectly absorb excitation energy corresponding to a chromium absorption band via chromium 140 absorption and transfer to the ytterbium 130.

As will be discussed in more detail later, in various embodiments of luminescent borate 100, ytterbium 130 produces relatively strong emissions centered at about 985 nanometers (nm) and about 1050 nm, with emissions in the 985 nm band typically being of higher intensity. In addition, in some embodiments, neodymium 120 produces relatively strong emissions centered at about 880 nm and 1065 nm, with emissions in the 1065 nm band typically being of higher intensity. Although the neodymium 120 may directly absorb appropriate excitation energy (e.g., excitation energy in the neodymium absorption band), embodiments that also include chromium 140 enable the neodymium 120 also or alternatively to be excited through energy transfer from the chromium 140 (after the chromium 140 has absorbed excitation energy in the chromium absorption band). The direct absorption band for neodymium 120 is relatively narrow, when compared with the absorption band for chromium 140. Accordingly, the inclusion of chromium 140 advantageously enables the neodymium 120 to receive significant quantities of energy when the luminescent borate 100 is exposed to excitation energy in the broader chromium absorption band.

Figure 2:
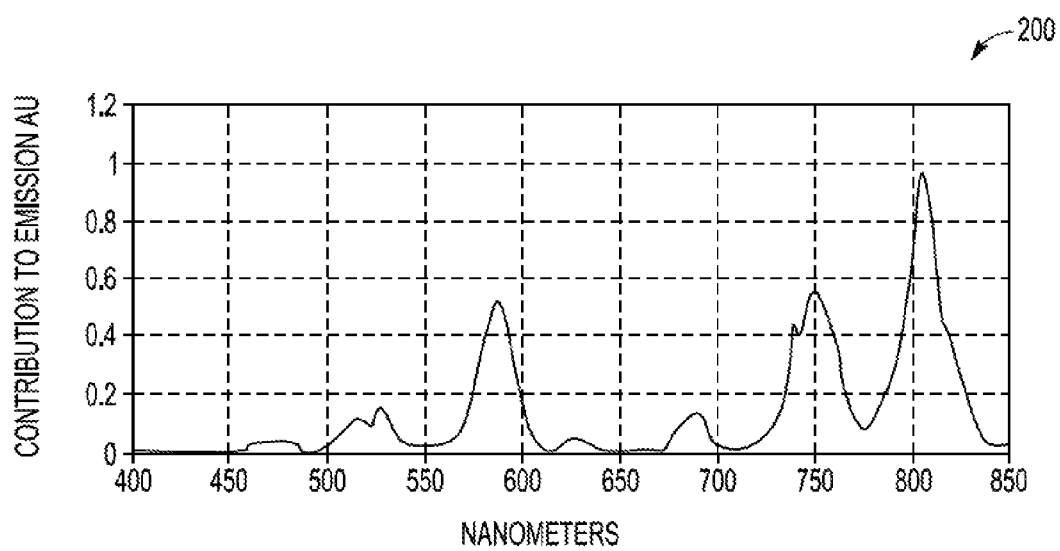
FIG. 2 is a graph depicting an absorption contribution to a neodymium emission as a function of excitation wavelength, according to an example embodiment.
Figure 3:
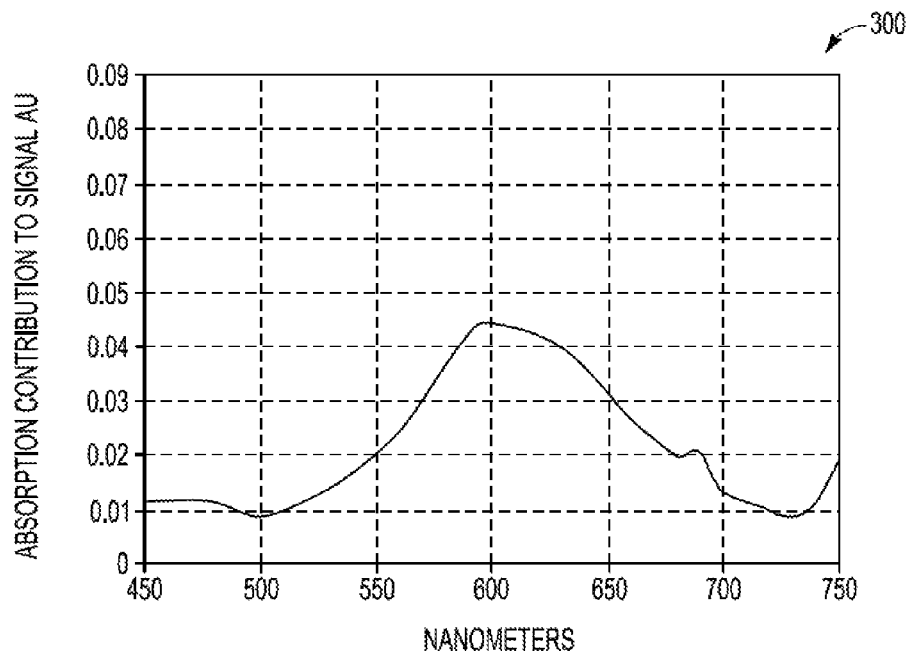
FIG. 3 is a graph depicting an absorption contribution to an ytterbium emission as a function of excitation wavelength and when chromium is the primary absorber, according to an example embodiment.

FIGS. 2 and 3 are graphs 200, 300 depicting absorption contributions (in arbitrary units, AU) to neodymium and ytterbium emissions (FIG. 2) and neodymium and ytterbium emissions through chromium absorption (FIG. 3), respectively, as a function of excitation wavelength (in nm), according to various example embodiments. More specifically, as shown in FIG. 2, in an embodiment that includes YAB with neodymium substituted for the yttrium at 80 percent, and ytterbium substituted for the yttrium at 20 percent, significant contributions to neodymium emissions in the 1065 nm band may be produced as a result of direct absorption, by the neodymium, of excitation energy having wavelengths of about 750 nm and 810 nm.

In contrast, the absorption band for chromium is relatively broad. For example, as shown in FIG. 3, in an embodiment that includes YAB with chromium substituted for the aluminum at 20 percent, neodymium substituted for the yttrium at 20 percent, and ytterbium substituted for the yttrium at 10 percent, significant contributions to the ytterbium emission in the 985 nm band may be produced as a result of direct absorption, by the chromium, of excitation energy having wavelengths in a range from about 550 nm to about 680 nm, transfer of the absorbed energy from the chromium to the neodymium and the ytterbium, and additional transfer of energy received by the neodymium (from the chromium) to the ytterbium. As the described above, the neodymium absorption band that contributes to desired emissions is narrower than the chromium absorption band, and the neodymium absorption band is closer to the near infrared (NIR).

Referring again to FIG. 1, without chromium 140, embodiments of luminescent borates 100 should include relatively high percentages of neodymium 120 in order to achieve sufficient absorption of excitation energy in the neodymium absorption band. However, because chromium 140 transfers energy so efficiently to neodymium 120, embodiments of luminescent borates 100 that include both chromium 140 and neodymium 120 may take advantage of the relatively wide chromium absorption band, and may include significantly lower percentages of neodymium 120, while still achieving sufficient absorption (and/or transfer) of excitation energy to the neodymium 120.

In other words, in embodiments that include both neodymium 120 and chromium 140 (e.g., Cr:Nd:Borates and Cr:Nd:Yb:Borates), appropriate excitation energy may be provided in the broad chromium absorption band, which encompasses the narrower neodymium absorption band. In such embodiments, when excitation energy is provided in the chromium absorption band, the neodymium 120 may absorb some energy directly, but also receives a significant amount of additional energy from the chromium 140. Since much of the excitation energy may be absorbed by the chromium 140 and transferred to the neodymium 120, the substitution percentage of the neodymium 120 may be significantly lower than the substitution percentage in embodiments that do not include chromium 140 (e.g., neodymium 120 substitution percentages of about 5 percent or greater). Conversely, in embodiments that include neodymium 120 without chromium 140 (e.g., Nd:Yb:Borates), it is desirable to have relatively high neodymium 120 substitution percentages (e.g., in a range of about 50 to about 95 percent) to provide relatively high absorption cross-sections, thus ensuring that sufficient excitation energy is directly absorbed by the neodymium 120 and transferred to the emitting ion (e.g., ytterbium 130).

Embodiments of luminescent borate 100 have material properties that make them particularly well suited for use in environments in which the luminescent borate 100 is exposed to potentially-damaging chemicals and physical contact. Accordingly, embodiments of luminescent borate 100 are particularly well suited for use in conjunction with security or authentication features of an article (e.g., features of an article that may be analyzed to determine authenticity of the article), although they may be used for other purposes, as well. For example, embodiments of luminescent borate 100 have a crystal hardness on the Moh's scale of about 7.5 and a density of about 3.701 grams/cubic centimeter (g/cc). Accordingly, luminescent borate 100 may be sufficiently hard to resist rapid physical degradation when subjected to physical abrasion, impacts, and other trauma. In addition, it has been observed that embodiments of luminescent borate 100 have a very weak body color, making luminescent borate 100 particularly suitable for use in covert authentication applications. For example, embodiments of luminescent borate 100 may be incorporated into a clear ink or other medium, and printed onto an article in a manner that the borate-containing ink or medium is not readily detectable to the unaided eye. In addition, embodiments of luminescent borate 100 are a uniaxial negative with two different refractive indices of about w=1.775 and about e=1.715, making the luminescent borate 100 suitable for other applications.

Figure 4:
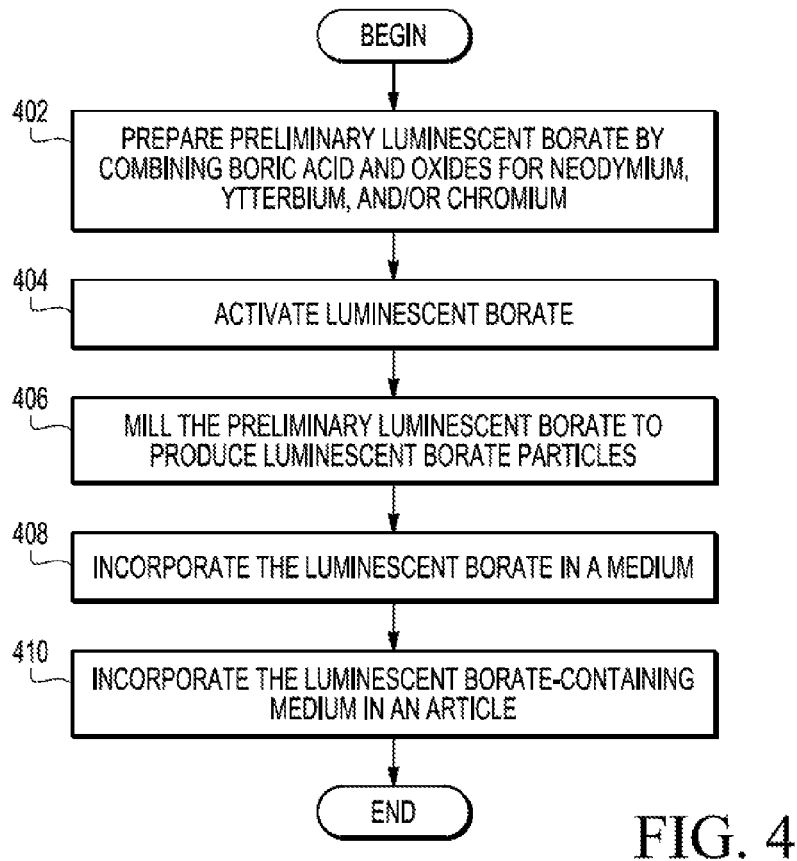
FIG. 4 is a flowchart of a method for producing a luminescent borate, a medium that includes the borate, and an article that includes the borate-containing medium, in accordance with an example embodiment.

FIG. 4 is a flowchart of a method for producing a luminescent borate (e.g., luminescent borate 100, FIG. 1), a medium that includes the borate, and an article (e.g., article 500, FIG. 5) that includes the borate-containing medium, in accordance with an example embodiment. The method begins, in block 402, by preparing a preliminary luminescent borate (e.g., luminescent borate 100, FIG. 1) having the formula $MeX_3B_4O_{12}$. Generally, a luminescent material may be created using any of a number of conventional processes that are known to those of skill in the art. For example, formation of preliminary luminescent borates of the various embodiments may be achieved using solid state chemistry, as described below. More specifically, according to an embodiment, the preliminary luminescent borate is prepared by growing a borate crystal using components that include all of the elements of the borate, typically in the form of oxides.

For example, a luminescent borate having the formula $MeX_3B_4O_{12}$, may be prepared using solid state chemistry. More particularly, to incorporate boron in the preliminary luminescent borate, boric acid ($H_3BO_3$) is one of the components used to grow the preliminary luminescent borate. As discussed previously, the element Me in the host borate may be yttrium, lanthanum, gadolinium, and/or lutetium, in various embodiments. Accordingly, another of the components used to grow the preliminary luminescent borate is either yttrium oxide ($Y_2O_3$), lanthanum oxide ($La_2O_3$), gadolinium oxide ($Gd_2O_3$), or lutetium oxide ($Lu_2O_3$) (referred to below as "Me oxides"), respectively, depending on which element Me is used in the luminescent borate. In addition, the element X in the luminescent borate may be aluminum, scandium, or gallium, in various embodiments. Accordingly, another of the components used to grow the preliminary luminescent borate is either aluminum oxide ($Al_2O_3$), scandium oxide ($Sc_2O_3$), or gallium oxide ($Ga_2O_3$) (referred to below as "X oxides"), respectively, depending on which element X is used in the luminescent borate.

Atom-for-atom replacements of the X and Me elements in the crystal lattice may be achieved by using neodymium oxide ($Nd_2O_3$), ytterbium oxide ($Yb_2O_3$), and/or chromium oxide ($Cr_2O_3$) as additional components used to grow the preliminary luminescent borate. According to an embodiment, the neodymium and ytterbium in the neodymium oxide and ytterbium oxide have +3 valences. In order to substitute neodymium and/or ytterbium into the Me sites of the preliminary luminescent borate, some or all of the Me oxide is replaced with desired amounts of neodymium oxide, or a combination of neodymium oxide and ytterbium oxide, where replacement quantities are defined in terms of atomic number (i.e., indicating the percentage of Me atoms replaced with neodymium and/or ytterbium atoms). For example, if it were desired to have 60 percent substitution of neodymium and 10 percent substitution of ytterbium in the Me sites of the preliminary luminescent borate, 60 percent of the Me oxide would be replaced with neodymium oxide, and 10 percent of the Me oxide would be replaced with ytterbium oxide. Similarly, in order to substitute chromium into the X sites of the preliminary luminescent borate, some of the X oxide is replaced with desired amounts of chromium oxide. For example, if it were desired to have 20 percent substitution of chromium in the X sites of the preliminary luminescent borate, 20 percent of the X oxide would be replaced with chromium oxide.

Once combined in the appropriate quantities (e.g., in quartz boats and/or alumina crucibles), the luminescent borate is activated, in block 404, by firing the combined components multiple times (e.g., four times, or some other number of times) at prescribed temperatures (e.g., temperatures in a range of about 500-1200 C, or a different range) for prescribed times (e.g., times in a range of about 30-60 minutes, or a different range), with powderizing processes being performed after each firing step. The resulting, powderized crystal thus forms the preliminary luminescent borate.

Although solid state chemistry may be used to create the preliminary luminescent borate, as discussed above, in other cases, solution chemistry techniques may be used. Using solution chemistry, the various materials are dissolved, subsequently precipitated, and subsequently fired. Depending on the particular process used to create the luminescent borate, other materials may be included in forming the preliminary luminescent borate. For example, various fluxing agents and other pre-cursors may be included within the preliminary luminescent borate.

In block 406, the preliminary luminescent borate may be further milled and/or filtered to produce crystal particles of desired sizes. For example, it has been found that the efficiency of the various embodiments of luminescent borates described herein may remain relatively high even when the luminescent borate powder includes particles with particle sizes of less than about 10 microns, and in some cases particles having sizes as low as about 1 micron. As used herein, the term "particle size" is defined as a particle mean diameter (e.g., a mass volume 50 percent point (D50) particle size mean diameter, as measured by a laser light diffraction type of measurement device, such as a device produced by Microtrac Inc. of Montgomeryville, Pa.).

In block 408, the luminescent borate particles are incorporated into a medium. For example, but not by way of limitation, the medium may correspond to a substrate of an article, or the medium may correspond to a material that may be applied to (e.g., printed on, coated on, sprayed on, or otherwise adhered to or bonded to) the surface of an article substrate, or a feature that is embedded within a substrate (e.g., an embedded feature, a security thread, and so on). In the former case, the luminescent borate particles may be incorporated into a substrate material, for example, by combining the luminescent borate particles with a base material (e.g., paper, paper pulp, a polymer, plastic, plastic base resin, glass, metal, a textile, fiber, ceramic, wood, a slurry, and so on) for the substrate, and/or by impregnating the substrate with a colloidal dispersion of the luminescent borate particles. Impregnation may be performed, for example, by a printing, dripping, coating or spraying process.

In embodiments in which the luminescent borate particles are incorporated into a material that may be applied to a surface of a substrate, the luminescent borate particles are mixed in with a composition (e.g., an ink, ink additive or other carrier). In embodiments in which the luminescent borate particles are incorporated into a feature that is embedded within a substrate, incorporation of the luminescent borate particles into the feature may be performed in a similar manner to incorporation of the luminescent borate into the substrate, as discussed above. More particularly, the luminescent borate particles may be mixed with a base material from which the embedded feature is formed. In still other embodiments, luminescent borate particles may be incorporated or combined with other media (e.g., glues, various liquids, gels, and so on).

In block 410, an article is produced that includes the luminescent borate. For example, this may be accomplished by incorporating the luminescent borate-containing medium or feature in or on an article (e.g., article 500, FIG. 5). In embodiments in which the luminescent borate-containing medium is the base material for the substrate, this step may be bypassed. Conversely, in embodiments in which the luminescent borate-containing material is applicable to a surface of the substrate, the luminescent borate-containing material may be printed onto one or more surfaces of the substrate in pre-determined locations. Conversely, when the luminescent borate-containing material corresponds to an embedded feature, the embedded feature is integrated with the substrate material when the substrate material is in a malleable form (e.g., when the material is a slurry, molten, or non-cured form). In any one of the above-described manners, an embodiment of a luminescent borate may be incorporated into an article.

Figure 5:
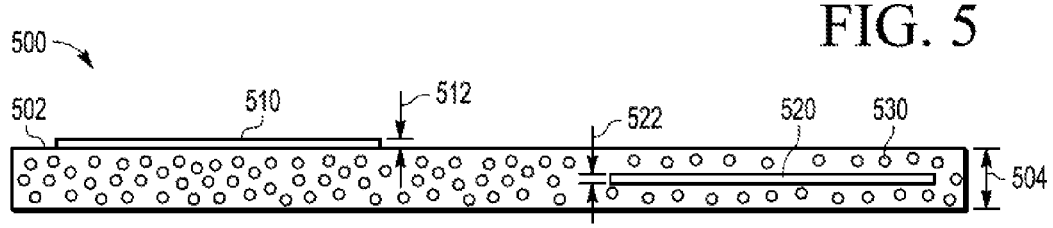
FIG. 5 is a cross-sectional, side view of an article that includes a substrate and an authentication feature, according to an example embodiment.

FIG. 5 depicts a cross-sectional view of an article 500 that includes a luminescent borate, according to an example embodiment. For example, an embodiment of an article 500 may include surface-applied and/or embedded authentication features 510, 520 that include the luminescent borate particles (not illustrated), and/or the article 500 may include luminescent borate particles 530 that are evenly or unevenly dispersed within one or more components of the article 500 (e.g., within substrate 502 and/or one or more layers or other components of the article). The various relative dimensions of the authentication features 510, 520 and particles 530 may not be to scale in FIG. 5. Although article 500 is illustrated to include both surface-applied and/or embedded authentication features 510, 520 and particles 530, another article may include one or a combination of embedded authentication features, surface-applied authentication features, and dispersed luminescent borate particles. Finally, although only one surface-applied authentication feature 510 and one embedded authentication feature 520 are shown in FIG. 5, an article may include more than one of either type of authentication feature 510, 520.

In various embodiments, article 500 may be any type of article selected from a group that includes, but is not limited to, an identification card, a driver's license, a passport, identity papers, a banknote, a check, a document, a paper, a stock certificate, a packaging component, a credit card, a bank card, a label, a seal, a token (e.g., for use in gambling and/or with a gaming or vending machine), a postage stamp, a liquid, a human, an animal, and a biological sample. Substrate 502 may be any of various types of substrates, and includes one or more materials selected from a group that includes, but is not limited to, paper, a polymer, glass, a metal, a textile, and a fiber.

Substrate 502, which may be rigid or flexible, may be formed from one or more layers or components, in various embodiments. The variety of configurations of substrate 502 are too numerous to mention, as the luminescent borates of the various embodiments may be used in conjunction with a vast array of different types of articles. Therefore, although a simple, unitary substrate 502 is illustrated in FIG. 5, it is to be understood that substrate 502 may have any of a variety of different configurations. For example, a substrate may be a "composite" substrate that includes a plurality of layers or sections of the same or different materials. For example, but not by way of limitation, a substrate may include one or more paper layers or sections and one or more plastic layers or sections that are laminated or otherwise coupled together to form the composite substrate (e.g., a paper layer/plastic layer/paper layer or plastic layer/paper layer/plastic layer composite substrate). In addition, although inanimate, solid articles are discussed herein, it is to be understood that an "article" also may include a human, an animal, a biological specimen, a liquid sample, and virtually any other object or material into or onto which a luminescent material of an embodiment may be included.

Surface-applied authentication feature 510 may be, for example but not by way of limitation, a printed authentication feature or an authentication feature that includes one or more rigid or flexible materials into which or onto which a luminescent borate of an embodiment is included. For example, but not by way of limitation, the surface-applied authentication feature 510 may comprise an ink, pigment, coating, or paint that includes particles of a luminescent borate of an embodiment. Alternatively, the surface-applied authentication feature 510 may comprise one or more rigid or flexible materials into which or onto which particles of a luminescent borate of an embodiment are included, where the substrate is then adhered or otherwise attached to a surface of the article substrate 502. According to various embodiments, surface-applied authentication feature 510 may have a thickness 512 of about one micron or more, and surface-applied authentication feature 510 may have a width and length that is less than or equal to the width and length of the substrate 502.

Embedded authentication feature 520 comprises one or more rigid or flexible materials in which or onto which a luminescent borate of an embodiment is included. For example, but not by way of limitation, embedded authentication feature 520 may be configured in the form of a discrete, rigid or flexible substrate, a security thread, or another type of structure. According to various embodiments, embedded authentication feature 520 may have a thickness 522 in a range of about one micron up to the thickness 504 of the substrate 502, and embedded authentication feature 520 may have a width and length that is less than or equal to the width and length of the substrate 502.

As mentioned above, luminescent borate particles 530 may be evenly or unevenly dispersed within substrate 502, as shown in FIG. 5, or within one or more other components of the article 500 (e.g., within one or more layers or other components of the article), in other embodiments. The luminescent borate particles 530 may be dispersed within substrate 502 or another component, for example but not by way of limitation, by mixing particles 530 into a base material for the substrate 502 or other component, and/or by impregnating the substrate 502 or other component with a colloidal dispersion of the particles 530, as discussed previously.

The absorption and emission properties of embodiments of luminescent borates discussed herein (e.g., luminescent borate 100, FIG. 1) are consistent with their use in conjunction with security and authentication features. For example, using relatively conventional authentication equipment, embodiments of luminescent borates may be readily excited. In embodiments that include neodymium without chromium (e.g., Nd:Yb:Borates), the luminescent borates may be excited with excitation energies in the neodymium absorption band. In embodiments that include chromium (e.g., Cr:Nd: Borates, Cr:Yb:Borates, and Cr:Nd:Yb:Borates), the luminescent borates may be excited with excitation energies in both the neodymium and the chromium absorption bands. As discussed previously, in embodiments that include both neodymium and ytterbium (e.g., Nd:Yb:Borates and Cr:Nd: Yb:Borates), the neodymium may readily transfer absorbed energy to ytterbium (e.g., either energy absorbed directly as excitation energy in the neodymium absorption band or energy received from the chromium). In such embodiments, the neodymium may produce detectable emissions in neodymium emission bands, and the ytterbium may produce detectable emissions in ytterbium emission bands.

According to an embodiment, detection equipment may be configured to detect either or both the neodymium and the ytterbium emissions, and to determine whether those emission intensities fall within a detection parameter space. In addition, it has been found that the ratio of the peaks between the neodymium and ytterbium emissions is a strong function of the neodymium and ytterbium substitution percentages, as well as the selection of the element substituted for Me in the host borate (e.g., yttrium, lanthanum, gadolinium, and/or lutetium). Accordingly, embodiments of detection equipment may measure the intensities of emissions in a neodymium emission band (e.g., an emission band centered at about 880 nm) and an ytterbium emission band (e.g., an emission band centered at about 985 nm), calculate the ratio of those intensities, and determine whether the ratio corresponds to an authenticating material with the appropriate host borate, and the known neodymium and ytterbium substitution percentages.

Figure 6:
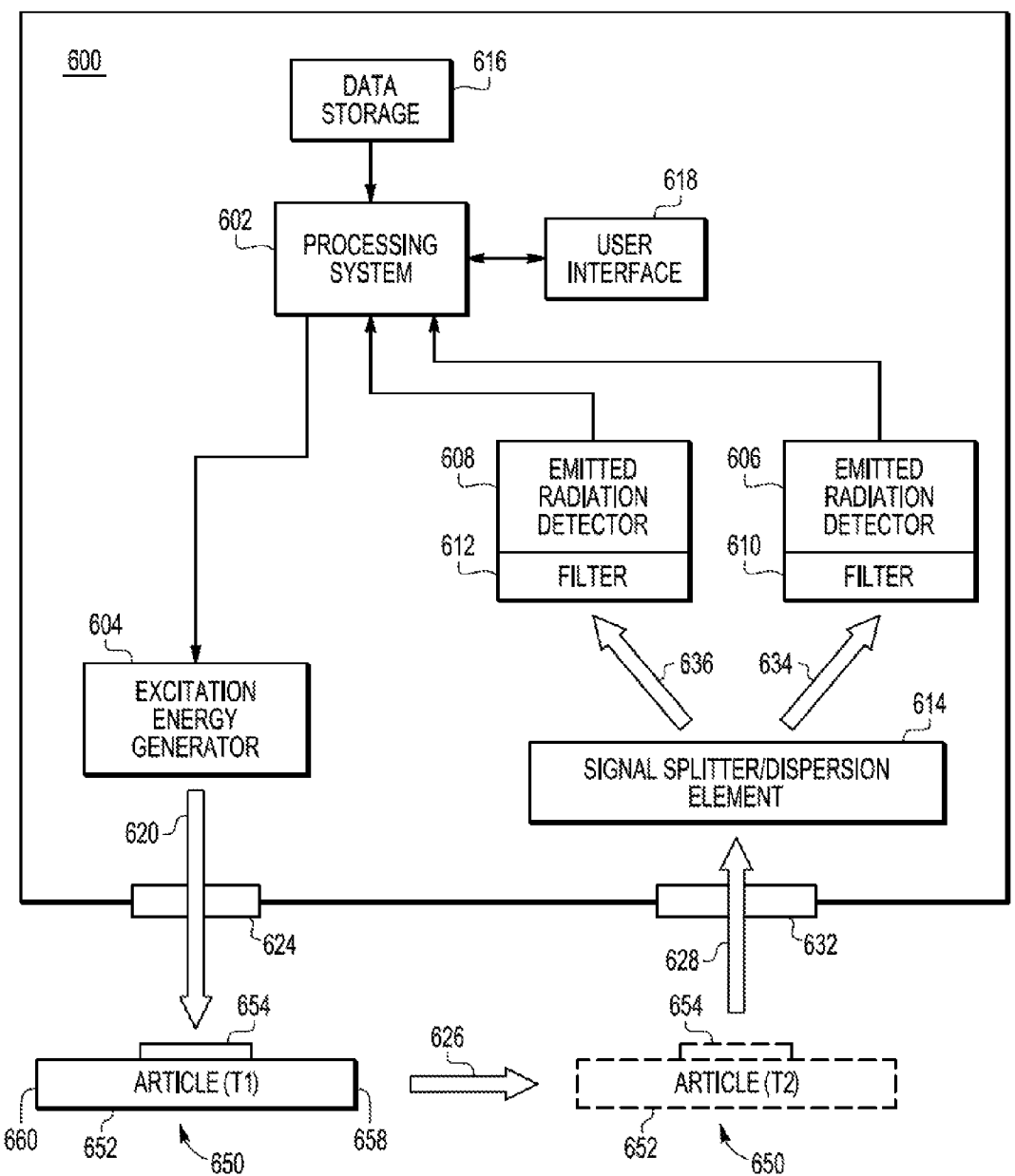
FIG. 6 is a system for authenticating an article, in accordance with an example embodiment.

FIG. 6 is a system 600 for authenticating an article 650 (e.g., at a high rate of article speed), in accordance with an example embodiment. System 600 includes a processing system 602, one or more excitation energy generators 604, one or more emissions photodetectors ("detectors") 606, 608 with associated optical filters (filters) 610, 612, a signal splitter/dispersion element 614, data storage 616, and a user interface 618, according to an embodiment. Processing system 602 may include one or more processors and associated circuitry, which is configured to implement control and analysis processes (e.g., in the form of executable software algorithms) associated with authenticating an article (e.g., article 650).

Article 650 includes a substrate 652 and, optionally, a surface-applied or embedded authentication feature 654, as discussed previously. In an embodiment, article 650 is transported through the authentication system 600 in a processing direction 626, with an incident edge 658 of article 650 being presented to the system 600 first, and a trailing edge 660 of the article 650 being presented to the system 600 last. For example, at a first time (T1), article 650 is passed under an excitation window 624 of system 600, and at a second, subsequent time (T2), article 650 is passed under a detection window 632 of system 600. In an alternate embodiment, article 650 may be moved into a stationary position within the authentication system 600, and the excitation and detection windows 624, 632 may be moved over the stationary article 650. In yet another alternate embodiment, both the article 650 and the excitation and detection windows 624, 632 may be stationary throughout the process of excitation and authentication (i.e., neither the article 650 nor the authentication system 600 move).

Either way, according to an embodiment, processing system 602 is configured to provide control signals to an excitation energy generator 604, which cause excitation energy generator 604 to direct excitation energy 620 toward article 650 along a pre-defined excitation track having a width corresponding to about a width of the excitation window 624. As the article 650 is moved under the excitation window 624 (or the excitation window 624 is moved over the article 650), emitting ions in a luminescent borate incorporated in the substrate 602 or an authentication feature 654, receive energy for subsequent radiation (using one or more energy absorption and/or transfer mechanisms). In an alternate embodiment, processing system 602 controls the excitation energy generator 604 to direct intensity modulated excitation energy 620 toward article 650. Accordingly, excitation energy 620 is turned on for a sufficient period of time to excite the luminescent borate, and then turned off to allow the emission decay to be observed and quantified (e.g., by emissions detectors 606, 608). In such an embodiment, the excitation and detection windows 624, 632 may be combined.

In the control signals, processing system 602 may specify the timing (e.g., start time, stop time, and/or duration) of the provision of excitation energy, and/or other parameters associated with the particular excitation energy to be generated (e.g., intensities and/or other parameters). Typically, the bandwidth of the excitation energy is pre-determined based on the excitation source that is included as part of the excitation energy generator 604 (e.g., the bandwidth of excitation energy produced by a selected light emitting diode or laser diode). As discussed previously, appropriate excitation energy for a luminescent borate of an embodiment may be in a neodymium and/or chromium absorption band, in various embodiments. The various timing and/or radiation generation parameters may be retrieved from data storage 616, for example. Excitation energy generator 604 may include, for example, one or more lasers, laser diodes, light-emitting diodes (LEDs), incandescent filaments, lamps, or other excitation sources.

In addition to controlling excitation energy generator 604, processing system 602 is configured to provide control inputs to emissions detectors 606, 608, which cause emissions detectors 606, 608 to attempt to detect emissions 628 emanating from article 650 in response to various emitting ions having absorbed (either directly or indirectly) at least some of the excitation energy 620. For example, the article 650 may produce emissions corresponding to neodymium and/or ytterbium emissions.

According to an embodiment, when article 650 is proximate detection window 632, the emissions 628 impinge upon the signal splitter/dispersion element 614, which separates the emissions 628 into beams 634, 636. One beam 634 includes light within a first band (e.g., a neodymium emission band), and the second beam 636 includes light within a second band that does not overlap and is separated from the first band (e.g., an ytterbium emission band). Signal splitter/dispersion element 614 directs the first beam 634 toward one of detectors 606, and directs the second beam 636 toward the other of detectors 608. According to an embodiment, signal splitter/dispersion element 614 is configured to pass the first beam 634 and to reflect the second beam 636. For example, signal splitter/dispersion element 614 may be an element selected from a group consisting of a polychromator, a prism, diffraction grating, a thin-film filter, an interference filter, a dichroic filter, a dichroic mirror, and a dichroic reflector. An advantage to such a signal splitter/dispersion element 614 is that it enables both detectors 606, 608 simultaneously to receive components of an emission that emanated from a same area of the article 650, thus maximizing correlation of the resulting intensity measurements.

Each emissions detector 606, 608 may include, for example, a spectral filter 610, 612, one or more electro-optical sensors, photomultiplier tubes, avalanche photodiodes, photodiodes, charge-coupled devices, charge-injection devices, photographic films, or other detection devices. In a particular embodiment, each emissions detector 606, 608 includes a spectral filter 610, 612 positioned between the signal splitter/dispersion element 614 and a photodetector. The spectral filters 610, 612 are configured to filter the beams 634, 636 before they are provided to detectors 606, 608, so that emissions only within an emission band (i.e., a subset of the entire spectrum) actually impinges upon the active area of each detector 606, 608. The spectral filters 610, 612 may include, for example, long pass, bandpass, or other types of filters configured to pass light only within a spectral band of interest, and to reject all other light.

Each of detectors 606, 608 has sensitivity within a spectral band of interest, and accordingly may detect light passing through the spectral filter 610, 612 that is within that spectral band. According to an embodiment, detector 606 is configured to detect emissions within a channel corresponding to a first band of interest (a neodymium emission band), and detector 608 is configured to detect emissions within a channel corresponding to a second band of interest (an ytterbium emission band). The detectors 606, 608 may be of the same or different types or classes. According to a particular embodiment, detectors 606, 608 of different types or classes are used to measure the emission properties of the luminescent borate, which is feasible because the detected wavelengths of the neodymium and ytterbium emission bands are sufficiently separated. For example, one of detectors 606, 608 may include a silicon detector, and the other of detectors 606, 608 may include an indium-gallium-arsenide (InGaAs) detector (e.g., a telecom type or extended InGaAs). Other types of detectors that are capable of detecting emissions within a band of interest may be used, in other embodiments (e.g., lead-sulfide, lead-selenide, germanium, indium-antimonide, indium-arsenide, platinum-silicide, indium-antimonide, and so on). In an alternate embodiment, a single detector may be employed, which is capable of detecting emissions in all bands of interest. In such an embodiment, signal splitter/dispersion element 614 may be excluded from system 600.

Each detector 606, 608 produces an electronic signal that is proportional to the intensity of the collected radiation that impinges on the active area of the detector 606, 608. More particularly, each detector 606, 608 produces a signal (e.g., one or more digitized intensity values) representing an integrated intensity of the emissions received by the detector 606, 608 along substantially all or a portion of the length of the article (e.g., between an incident and trailing edge of the article). Desirably, when multiple detectors 606, 608 are used in the system (e.g., as in the system 600 of FIG. 6), the values of the integrated intensity are electronically captured by each detector 606, 608 at the same time, although this is not a requirement.

Each emissions detector 606, 608 may digitize intensity values at one or more pre-selected intervals (e.g., starting at t=0, and then every 0.01 milliseconds thereafter, for several intervals). In addition, each emissions detector 606, 608 provides information to processing system 602 (e.g., the digitized intensity values), which enables the temporal, spectral, and positional properties of the emissions 628 to be characterized. For example, emissions detector 606 produces a series of values corresponding to intensities of emitted radiation in a neodymium emission band. Each value or sets of values from detector 606 may be tagged or otherwise associated with information indicating a location of the detected emissions (e.g., a linear distance from the incident edge of the article) and a time when the emissions were detected (e.g., a time from discontinuation of provision of the corresponding excitation energy). Similarly, emissions detector 608 produces a series of values corresponding to intensities of emitted radiation in an ytterbium emission band. As with the values produced by emissions detector 606, each value or sets of values from detector 608 may be tagged or otherwise associated with information indicating a location of the detected emissions and a time when the emissions were detected.

Processing system 602 is configured to analyze such information, upon its receipt, in order to determine whether or not the temporal, spectral, and positional properties of any detected radiation correspond to the temporal, spectral, and positional properties of an authentic article. As will be described in more detail in conjunction with FIG. 7, authenticating parameters for the system 600 include parameters selected from a group consisting of: emission intensities (or integrated intensities) in a neodymium emission band; emission intensities (or integrated intensities) in an ytterbium emission band; emission decay time constant in the neodymium emission band; emission decay time constant in the ytterbium emission band; emission rise time constant in the neodymium emission band; emission rise time constant in the ytterbium emission band; and ratio of emission intensities (or integrated intensities) between emissions in the neodymium and ytterbium emission bands. Additional authenticating parameters may be defined, as well.

Ranges of authenticating parameters that correspond with an authentic article define the detection parameter space of the system 600. In an embodiment, processing system 602 determines whether the values produced by detectors 606, 608 for the authenticating parameters fall within the detection parameter space. In other words, processing system 602 compares the values with ranges defining the detection parameter space to determine whether the values fall within those ranges. For example, regarding the authentication parameter corresponding to the emission intensities in the neodymium and/or ytterbium emission bands, a table of intensity value ranges may be defined and stored in data storage 616. In order to analyze a particular intensity value (e.g., an intensity value from detector 606 or 608), processing system 602 may retrieve a pre-defined intensity range from the table, and may compare the intensity value with the range to determine whether the value falls within the range. Such analyses may be performed for intensity values at multiple locations along the length of the article. As another example, regarding the authentication parameter corresponding to the ratio of neodymium and ytterbium emission intensities, a range of acceptable ratios may be defined and stored in data storage 616. Processing system 602 may calculate the ratio of neodymium and ytterbium emission intensities (e.g., based on intensity values from detectors 606, 608), retrieve the pre-defined, acceptable ratio range from data storage 616, and may compare the ratio with the range to determine whether the ratio falls within the range. It has been found that the ratio between emission intensities for neodymium and ytterbium is a strong function of the substitution percentages of these ions. Accordingly, even when both neodymium and ytterbium emissions are detected, an article may be deemed unauthentic if the ratio does not correspond with an expected value. Values corresponding to the other authentication parameters may be similarly analyzed.

When the analysis indicates that the values corresponding with the authenticating parameters fall within the detection parameter space to within an acceptable degree of accuracy, processing system 602 may identify the article 650 as being authentic. Conversely, when the analysis indicates that the values corresponding with the authenticating parameters do not fall within the detection parameter space to within an acceptable degree of accuracy, processing system 602 is configured to identify the article 650 as being unauthentic.

When the temporal and/or spectral properties of detected radiation correspond with an authentic article, processing system 602 may take some action associated with identifying article 650 as an authentic article. For example, processing system 602 may send an electronic signal associated with authenticity to another component of the system or to an external system. In addition, processing system 602 may send a signal to user interface 618, which causes user interface 618 to produce a user-perceptible indication of authenticity (e.g., a displayed indicia, a light, a sound, and so on). Processing system 602 also may cause a routing component of system 600 (not illustrated) to route article 650 toward a route or bin assigned for authentic articles. Alternatively, when the temporal and/or spectral properties of the detected radiation do not correspond with an authentic article, processing system 602 may take some action associated with identifying article 650 as an unauthentic article. For example, processing system 602 may send an electronic signal associated with unauthenticity to another component of the system or to an external system. In addition, processing system 602 may send a signal to user interface 618, which causes user interface 618 to produce a user-perceptible indication of unauthenticity (e.g., a displayed indicia, a light, a sound, and so on). Processing system 602 also may cause a routing component of system 600 (not illustrated) to route article 650 toward a route or bin assigned for unauthentic articles.

User interface 618 may include any of a number of components that may be manipulated by a user to provide inputs to system 600 (e.g., keyboards, buttons, touchscreens, and so on), or which may be controlled by processing system 602 to produce user-perceptible indicia (e.g., display screens, lights, speakers, and so on). The above-described process may be initiated in response to user inputs provided through the user's interaction with user interface 618, for example. Alternatively, the above-described process may be initiated automatically by the system 600, such as when the article 650 has been positioned in a location at which the excitation and detection processes may be performed.

Figure 7:
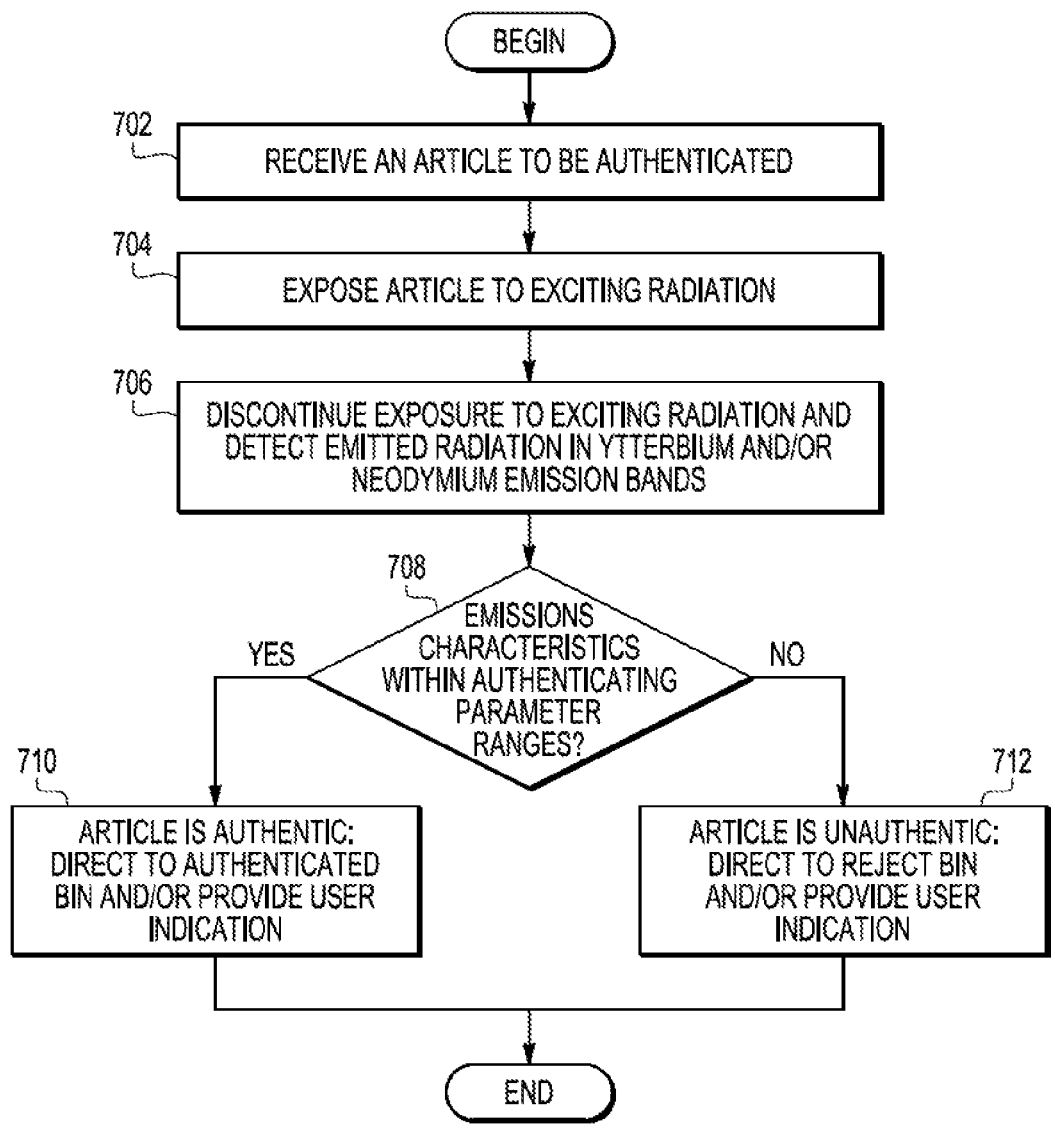
FIG. 7 is a flowchart of a method for performing authentication of an article, in accordance with an example embodiment.

FIG. 7 is a flowchart of a method for performing authentication of an article (e.g., article 500, FIG. 5 or article 650, FIG. 6), in accordance with an example embodiment. For example, embodiments of the method depicted in FIG. 7 may be performed by an authentication system (e.g., authentication system 500, FIG. 5). The method may begin, in block 702, when an article to be authenticated (e.g., article 650, FIG. 6) is received by the authentication system. For example, an article may be routed (e.g., by a sorting or conveyor system) into the authentication system in a known or unknown orientation with an incident edge of the article first entering the authentication system. As another example, the article may be placed into an appropriate receptacle of the authentication system.

In block 704, the article is exposed to excitation energy appropriate for the absorbing and/or sensitizing ions in the luminescent borate. As discussed previously, in embodiments in which the article includes a luminescent borate with neodymium but not chromium, the excitation energy may be in a neodymium absorption band. Conversely, in embodiments in which the article includes a luminescent borate with both neodymium and chromium, the excitation energy may be in a chromium absorption band. To provide the excitation, the article may be routed to or past an excitation area (e.g., under excitation window 624, FIG. 6), and the processing system (e.g., processing system 602, FIG. 6) may send a control signal to an excitation energy generator (e.g., excitation energy generator 604, FIG. 6) that causes the excitation energy generator to direct the excitation energy (e.g., excitation energy 620, FIG. 6) toward the article. Alternatively, the excitation energy generator may continuously provide the excitation energy or the excitation energy may be modulated.

In block 706, provision of the excitation energy to the article is discontinued, and the authentication system detects emissions within one or more bands from the article (e.g., by emissions detectors 606, 608, FIG. 6). Discontinuation of the excitation energy may be accomplished either by turning the excitation energy generator off (e.g., in a system in which the article may remain stationary and the excitation energy is pulsed), or by routing the article away from the area where the excitation energy is being directed, and to a detection area (e.g., under detection window 632, FIG. 6). In an alternate embodiment, provision of the excitation energy may continue while the system performs the detection processes described below.

Emissions detection may be performed at one or more detection intervals, which are measured from the time that direction of the excitation energy toward the article was discontinued. According to an embodiment, the system is configured to detect emissions in an ytterbium and/or neodymium band, although the system may be configured to detect emissions in other bands, as well.

Information quantizing the intensities of detected emissions within the ytterbium and/or neodymium bands is analyzed (e.g., by processing system 602, FIG. 6). According to an embodiment, the information includes one or more series of digitized intensity values (e.g., from each of detectors 606, 608, FIG. 6) corresponding to intensities of emitted radiation in the ytterbium and/or neodymium emission bands. As discussed previously, individual values or sets of values may be tagged or otherwise associated with information indicating a time when the emissions were detected. The digitized intensity values represent the temporal and spectral properties of the detected emissions in the ytterbium and/or neodymium emission bands.

In block 708, a determination is made whether the temporal and/or spectral characteristics of the emissions fall within appropriate authenticating parameter ranges (e.g., emission intensity ranges for ytterbium and/or neodymium, an ytterbium/neodymium emission ratio range, and/or a decay time constant range). For example, as discussed previously, appropriate authenticating parameter ranges may be maintained by the authentication system in one or more tables or values that define the detection parameter space.

In conjunction with the spectral analysis, when a digitized intensity value falls within an appropriate emission intensity range for the time associated with the value (i.e., a time from discontinuation of the excitation energy when the intensity value was generated), a determination may be made that an emission having characteristics of an ytterbium and/or neodymium emission has been detected. Otherwise, when a digitized intensity value falls outside the appropriate emission intensity range for the time associated with the value, a determination may be made that an emission having characteristics of an ytterbium and/or neodymium emission has not been detected. According to an embodiment, multiple digitized intensity values may be analyzed, and the determination may allow one or more of the intensity values to fall outside the appropriate emission intensity range, while still yielding a positive result. In other words, the determination may be made to within an acceptable degree of accuracy. When a determination is made that emissions having characteristics of ytterbium and/or neodymium emissions have not been detected (i.e., the analysis indicates that the intensity values do not fall within the detection parameter space to within an acceptable degree of accuracy), the system may identify the article as being unauthentic.

In conjunction with the temporal analysis, the system may determine the decay time of emissions within the ytterbium and/or neodymium bands. Accordingly, appropriate authenticating parameter ranges also may include decay time constant ranges. In an embodiment, the decay time(s) may be determined based on the detected intensities of the emissions at multiple times (e.g., t=0, t=0.01 millisecond, and so on). Upon removal of the excitation energy, the intensity of the emission decays over time, and the rate of decay for an emitting ion can be characterized by the decay time constant. For example, for a simple exponential decay in emission intensity, the decay time constant can be represented by the constant τ in the equation:

$$I(t) = I_0 e^{-t/\tau},$$ (Equation 1)

where t denotes time, I(t) denotes the emission intensity at time t, and $I_0$ denotes the emission intensity at t=0 (e.g., t=0 may correspond to the instant when the provision of excitation energy is discontinued). Although the emission intensity for some luminescent borates may decay according to the above, simple exponential formula, the emission intensity for other luminescent borates may be affected by multiple exponential decays (e.g., when multiple mechanisms affecting the decay are present). In some cases, a luminescent borate may not exhibit a simple single exponential decay, especially when energy transfer is part of the mechanism. According to an embodiment, the system determines whether or not the decay times of the ytterbium and/or neodymium emissions fall within the appropriate decay time constant ranges.

When the determination in block 708 yields a positive result (i.e., ytterbium and/or neodymium emissions having sufficient intensities and in-range decay times were appropriately detected), then in block 710, the system may identify the article as being authentic, and may take a corresponding action. For example, the system may produce a user-perceptible indication of authenticity, and/or may cause a routing component of the system to route the article toward a route or bin assigned for authentic articles. Alternatively, the determination in block 708 yields a negative result (i.e., ytterbium and/or neodymium emissions having sufficient intensities and in-range decay times were not detected), the system may identify the article as being unauthentic, and may take a corresponding action, in block 712. For example, the system may produce a user-perceptible indication of unauthenticity, and/or may cause a routing component of the system to route the article toward a route or bin assigned for unauthentic articles.

Figure 8:
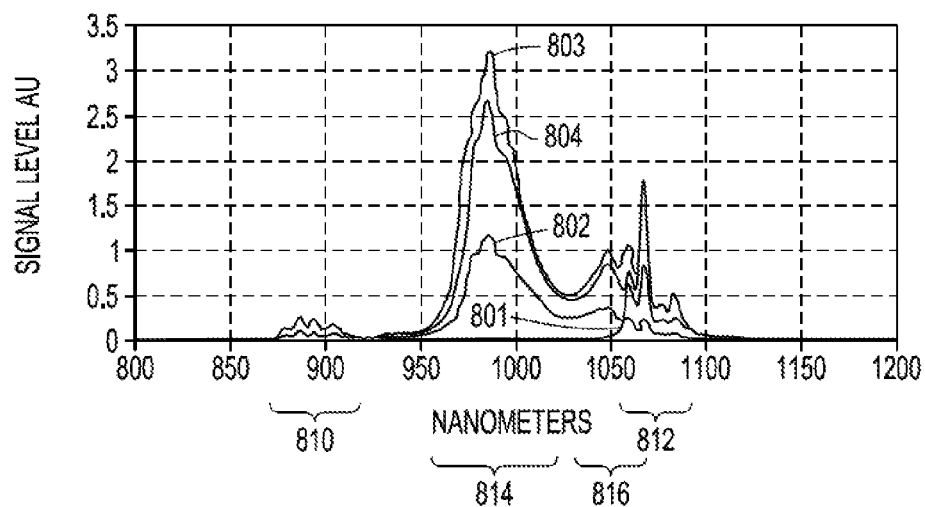
FIG. 8 is a graph illustrating emission intensities of multiple yttrium aluminum borate (YAB) samples with various percentages of substituted neodymium and ytterbium, according to several example embodiments.
Figure 9:
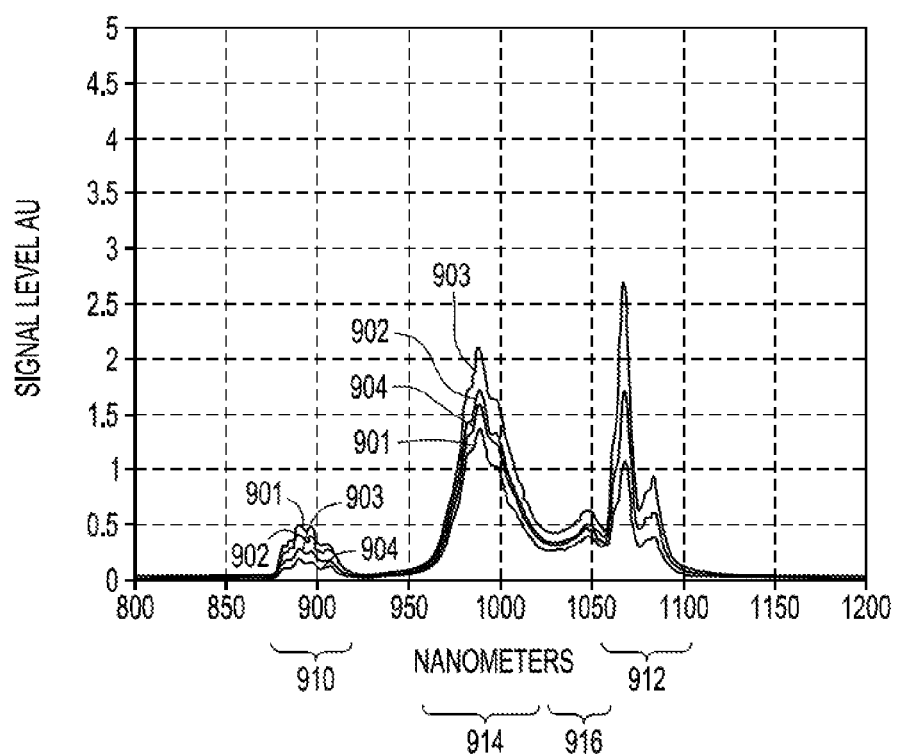
FIG. 9 is a graph illustrating emission intensities of multiple YAB samples with various percentages of substituted neodymium, ytterbium, and chromium according to several example embodiments.
Figure 10:
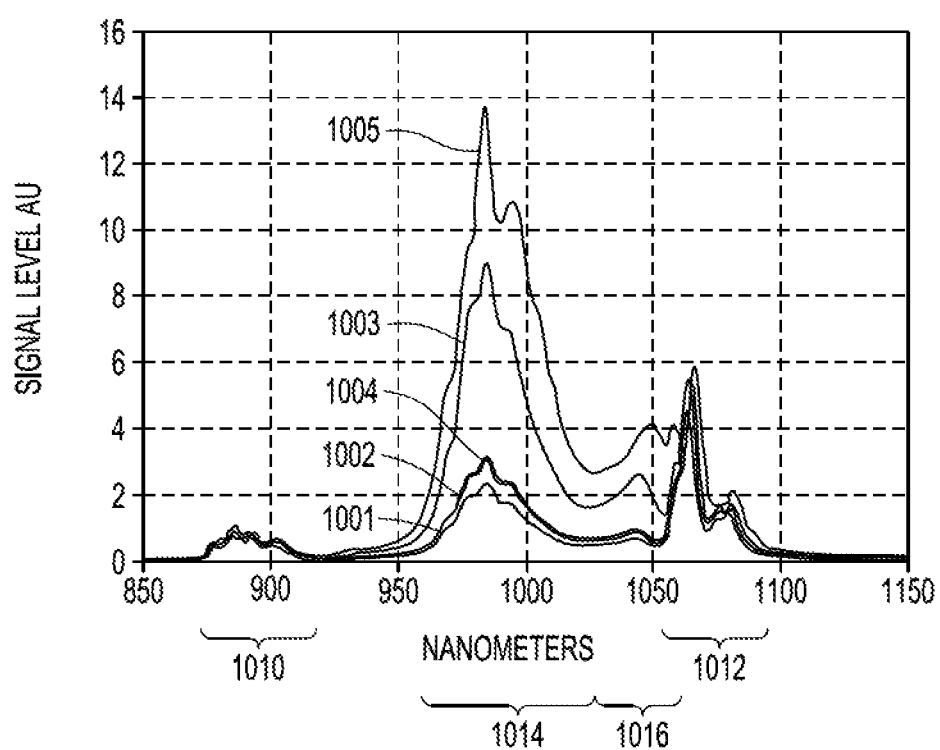
FIG. 10 is a graph illustrating emission intensities of multiple aluminum borate samples percentages of substituted neodymium, ytterbium, and chromium according to several example embodiments.

FIGS. 8-10 include graphs depicting emission intensities of various embodiments of luminescent borates incorporated into articles. For example, FIG. 8 is a graph illustrating emission intensities of multiple yttrium aluminum borate (YAB) samples with various percentages of substituted neodymium and ytterbium, according to several example embodiments. To generate the results depicted in FIG. 8, particles of various YAB samples were included in inks printed on paper handsheet article substrates. More particularly, inks were created that included an ink base and various YAB samples, according to several embodiments.

For example, to produce a sample used to generate trace 801, a first ink material comprising Nd:YAB (with the Nd at 100 percent in a YAB host lattice material) was printed on a surface of a paper handsheet article substrate. To produce a sample used to generate trace 802, a second ink material comprising Nd:Yb:YAB (with the Nd at 50 percent and the ytterbium at 50 percent in a YAB host lattice material) was printed on a surface of a paper handsheet article substrate. To produce a sample used to generate trace 803, a third ink material comprising Nd:Yb:YAB (with the Nd at 90 percent and the ytterbium at 10 percent in a YAB host lattice material) was printed on a surface of a paper handsheet article substrate. Finally, to produce a sample used to generate trace 804, a fourth ink material comprising Nd:Yb:YAB (with the Nd at 75 percent and the ytterbium at 25 percent in a YAB host lattice material) was printed on a surface of a paper handsheet article substrate.

For each of the above samples, an LED was used to excite the printed feature into the neodymium absorption band (i.e., at 750 nm), and the resulting emission intensities were detected by an authentication system. More particularly, the detected emissions included emissions in neodymium emission band 810 (centered at about 880 nm) and neodymium emission band 812 (centered at about 1065 nm). In the samples that included ytterbium, the detected emissions also included emissions in ytterbium emission band 814 (centered at about 985 nm) and ytterbium emission band 816 (centered at about 1050 nm).

As shown in FIG. 8, the intensity of the ytterbium emissions in ytterbium emission band 814 increased as the percentage of neodymium included in the host borate increased. More specifically, the third ink material comprising Nd:Yb:YAB (with the ND at 90 percent and the ytterbium at 10 percent) produced ytterbium emissions (trace 803) having the highest intensity. This result indicates the efficiency of the energy transfer from the neodymium to the ytterbium, when the neodymium is excited into the neodymium absorption band. The higher neodymium concentration increases the absorption of the sample, which can result in more overall emission signal. The increase in ytterbium concentration can be more effective, through the energy transfer process, in reducing the neodymium emission signal and increasing the ytterbium emission signal.

Although an authentication system (e.g., authentication system 600, FIG. 6) may attempt to detect emissions in either of the neodymium emission bands 810, 812, and/or either of the ytterbium emission bands 814, 816, an embodiment specifically includes filters (e.g., filters 610, 612, FIG. 6) and detectors (e.g., detectors 606, 608) configured to detect emissions in neodymium emission band 810 (centered at about 880 nm) and/or ytterbium emission band 814 (centered at about 985 nm). Regarding the filter/detector for the neodymium emissions, it may be preferable to select a filter/detector sensitized to emissions in band 810 because the emissions in band 812 are on a rapidly decaying response part of the silicon detector curve. Regarding the filter/detector for the ytterbium emissions, it may be preferable to select a filter/detector sensitized to emissions in band 814 because the intensity of the emissions in band 814 may be significantly greater than the intensity of the emissions in band 816. Accordingly, when measuring emissions in band 814, relatively inexpensive and high quality silicon detector elements may be used, and detection may be more efficient since most of the energy is deposited in band 814.

FIG. 9 is a graph illustrating emission intensities of multiple YAB samples with various percentages of substituted neodymium, ytterbium, and chromium according to several example embodiments. To generate the results depicted in FIG. 9, particles of various YAB samples were included in inks printed on paper handsheet article substrates. More particularly, inks were created that included an ink base and various YAB samples, according to several embodiments.

For example, to produce a sample used to generate trace 901, a first ink material comprising Cr:Nd:Yb:YAB (with the Cr at 20 percent, the Nd at 20 percent, and the Yb at 10 percent in a YAB host lattice material) was printed on a surface of a paper handsheet article substrate. To produce a sample used to generate trace 902, a second ink material comprising Cr:Nd:Yb:YAB (with the Cr at 20 percent, the Nd at 35 percent, and the Yb at 20 percent in a YAB host lattice material) was printed on a surface of a paper handsheet article substrate. To produce a sample used to generate trace 903, a third ink material comprising Cr:Nd:Yb:YAB (with the Cr at 20 percent, the Nd at 35 percent, and the Yb at 30 percent in a YAB host lattice material) was printed on a surface of a paper handsheet article substrate. Finally, to produce a sample used to generate trace 904, a fourth ink material comprising Cr:Nd:Yb:YAB (with the Cr at 20 percent, the Nd at 35 percent, and the Yb at 40 percent in a YAB host lattice material) was printed on a surface of a paper handsheet article substrate.

For each of the above samples, an LED was used to excite the printed feature into the chromium absorption band (i.e., at 626 nm), and the resulting emission intensities were detected by an authentication system. More particularly, the detected emissions included emissions in neodymium emission band 910 (centered at about 880 nm), neodymium emission band 912 (centered at about 1065 nm), ytterbium emission band 914 (centered at about 985 nm), and ytterbium emission band 916 (centered at about 1050 nm). FIG. 9 shows that, as the amount of ytterbium increases, the amount of neodymium signal decreases in neodymium emission band 910. This can allow for a more varied-ratio authentication signal.

FIG. 10 is a graph illustrating emission intensities of multiple aluminum borate samples percentages of substituted neodymium, ytterbium, and chromium according to several example embodiments. To generate the results depicted in FIG. 10, particles of various aluminum borate samples were included in inks printed on paper handsheet article substrates. More particularly, inks were created that included an ink base and various aluminum borate samples, according to several embodiments.

For example, to produce a sample used to generate trace 1001, a first ink material comprising Cr:Nd:Yb:YAB (with the Cr at 20 percent, the Nd at 10 percent, and the Yb at 10 percent in a YAB host lattice material) was printed on a surface of a paper handsheet article substrate. To produce a sample used to generate trace 1002, a second ink material comprising Cr:Nd:Yb:YAB (with the Cr at 20 percent, the Nd at 10 percent, and the Yb at 20 percent in a YAB host lattice material) was printed on a surface of a paper handsheet article substrate. To produce a sample used to generate trace 1003, a third ink material comprising Cr:Nd:Yb:GdAB (with the Cr at 20 percent, the Nd at 10 percent, and the Yb at 20 percent in a gadolinium aluminum borate host lattice material) was printed on a surface of a paper handsheet article substrate. To produce a sample used to generate trace 1004, a fourth ink material comprising Cr:Nd:Yb:YAB (with the Cr at 20 percent, the Nd at 10 percent, and the Yb at 15 percent in a YAB host lattice material) was printed on a surface of a paper handsheet article substrate. Finally, to produce a sample used to generate trace 1005, a fifth ink material comprising Cr:Nd:Yb:LaAB (with the Cr at 20 percent, the Nd at 10 percent, and the Yb at 20 percent in a lanthanum aluminum borate host lattice material) was printed on a surface of a paper handsheet article substrate.

For each of the above samples, an LED was used to excite the printed feature into the chromium absorption band (i.e., at 626 nm), and the resulting emission intensities were detected by an authentication system. More particularly, the detected emissions included emissions in neodymium emission band 1010 (centered at about 880 nm), neodymium emission band 1012 (centered at about 1065 nm), ytterbium emission band 1014 (centered at about 985 nm), and ytterbium emission band 1016 (centered at about 1050 nm).

As shown in FIG. 10, the intensity of the ytterbium emissions in ytterbium emission band 914 for the lanthanum aluminum borates (trace 1005) and the gadolinium aluminum borates (trace 1003) were very high, when compared with a YAB sample having the same percentages of substituted neodymium and ytterbium. This indicates the suitability of the various embodiments of luminescent borates discussed herein for authentication and other applications. It has been found that the substitution of lanthanum or gadolinium can change the melting point of the borate material, potentially resulting in a different crystal phase. In such embodiments, the crystal phase may be almost completely monoclinic, in contrast with the mixture of rhombohedral and monoclinic phases for a YAB material. A single crystal material typically exhibits a much shorter decay time constant and a higher emission intensity. In various embodiments, the emission of the YAB material can be made to nearly match the emissions of the lanthanum or gadolinium based materials by increasing the phosphor production temperature.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A luminescent material comprising:
a luminescent borate formed from a borate having a crystal structure and including a first substitutable element and a second substitutable element;
wherein the luminescent borate comprises one or more rare earth ions substituted for the first substitutable element, wherein the one or more rare earth ions are selected from a group consisting of neodymium and ytterbium; and
wherein the luminescent borate further comprises chromium substituted for the second substitutable element.

2. The luminescent material of claim 1, wherein the borate has a formula $MeX_3B_4O_{12}$, wherein
Me is the first substitutable element, which is selected from a group consisting of yttrium, lanthanum, gadolinium, lutetium, and a mixture thereof,
X is the second substitutable element, which is selected from a group consisting of aluminum, scandium, and gallium,
B is boron, and
O is oxygen.

3. The luminescent material of claim 1, wherein the borate has the formula $YAl_3B_4O_{12}$, where Y is the first substitutable element yttrium, Al is the second substitutable element aluminum, B is boron, and O is oxygen.

4. The luminescent material of claim 1, wherein the borate has the formula $LaAl_3B_4O_{12}$, where La is the first substitutable element lanthanum, Al is the second substitutable element aluminum, B is boron, and O is oxygen.

5. The luminescent material of claim 1, wherein the borate has the formula $GdAl_3B_4O_{12}$, where Gd is the first substitutable element gadolinium, Al is the second substitutable element aluminum, B is boron, and O is oxygen.

6. The luminescent material of claim 1, wherein the one or more rare earth ions comprises neodymium substituted for the first substitutable element at a substitution percentage of about 5 to about 100 percent.

7. The luminescent material of claim 1, wherein the one or more rare earth ions comprises ytterbium substituted for the first substitutable element at a substitution percentage in a range of about 5 to about 100 percent.

8. The luminescent material of claim 1, wherein the one or more rare earth ions comprises:
neodymium substituted for the first substitutable element at a first substitution percentage in a range of about 5 to about 95 percent; and
ytterbium substituted for the first substitutable element at a second substitution percentage in a range of about 5 to about 95 percent.

9. The luminescent material of claim 1, wherein the chromium is substituted at a substitution percentage up to 100 percent.

10. The luminescent material of claim 1, wherein the borate has a crystal structure selected from a group consisting of a monoclinic Huntite-like structure, a rhombohedral Huntite-like structure, and a mixed Huntite-like structure.

11. The luminescent material of claim 1, wherein the luminescent borate is in a form of particles, and the material further comprises:
a medium within which the particles are incorporated, wherein the medium is selected from a group consisting of a glue, a liquid, a gel, a polymer, a slurry, a plastic, plastic base resin, a glass, a ceramic, a metal, a textile, wood, fiber, paper pulp, and paper.

12. The luminescent material of claim 1, wherein the luminescent borate is in a powder form, and the luminescent material comprises luminescent borate particles with a particle size of less than about 10 microns.

13. A method for producing a luminescent material for use in authentication, the method comprising the steps of:
preparing a luminescent borate from a borate having a crystal structure and including a first substitutable element and a second substitutable element, wherein preparing the luminescent borate comprises:
substituting one or more rare earth ions for the first substitutable element of the borate, and
substituting chromium for the second substitutable element of the borate, wherein the one or more rare earth ions are selected from a group consisting of neodymium and ytterbium; and
dispersing the luminescent borate in a medium to produce the luminescent material.

14. The method of claim 13, wherein the borate has a formula $MeX_3B_4O_{12}$, wherein
Me is the first substitutable element, which is selected from a group consisting of yttrium, lanthanum, gadolinium, lutetium, and a mixture thereof,
X is the second substitutable element, which is selected from a group consisting of aluminum, scandium, and gallium,
B is boron, and
O is oxygen.

15. The method of claim 13, further comprising the step of:
processing the luminescent borate to produce particles with a particle size of less than 10 microns, wherein the particles of the luminescent borate are dispersed in the medium.

16. The method of claim 13, wherein the medium is selected from a group consisting of a glue, a liquid, a gel, a polymer, a slurry, a plastic, plastic base resin, a glass, a ceramic, a metal, a textile, wood, fiber, paper pulp, and paper.

17. An article comprising:
a security feature that includes:
a medium, and
particles of a luminescent borate dispersed in the medium, the luminescent borate formed from a borate having a crystal structure and including a first substitutable element and a second substitutable element, wherein the luminescent borate comprises one or more rare earth ions substituted for the first substitutable element, wherein the luminescent borate further comprises chromium substituted for the second substitutable element, and wherein the one or more rare earth ions are selected from a group consisting of neodymium and ytterbium.

18. The article of claim 17, wherein the borate has a formula $MeX_3B_4O_{12}$, wherein
Me is the first substitutable element, which is selected from a group consisting of yttrium, lanthanum, gadolinium, lutetium, and a mixture thereof,
X is the second substitutable element, which selected from a group consisting of aluminum, scandium, and gallium,
B is boron, and
O is oxygen.

19. The article of claim 17, further comprising:
a substrate, wherein the medium is an ink that is printed on a surface of the substrate.

20. The article of claim 17, wherein the article is an article selected from a group consisting of an identification card, a driver's license, a passport, identity papers, a banknote, a check, a document, a paper, a stock certificate, a packaging component, a credit card, a bank card, a label, a seal, a postage stamp, a token, a liquid, a human, an animal, and a biological sample.

* * * * *